United States Patent [19]

Jones

[11] Patent Number: 4,750,833
[45] Date of Patent: Jun. 14, 1988

[54] FIBER OPTIC DISPERSION METHOD AND APPARATUS

[75] Inventor: Roger S. Jones, Cranbury, N.J.

[73] Assignee: Princeton Applied Research Corp., Princeton, N.J.

[21] Appl. No.: 804,016

[22] Filed: Dec. 3, 1985

[51] Int. Cl.$^4$ .............................................. G01N 21/84
[52] U.S. Cl. .................................................. 356/73.1
[58] Field of Search ........................................ 356/73.1

[56] References Cited

U.S. PATENT DOCUMENTS 4,551,019  11/1985  Vella et al. ......................... 356/73.1

FOREIGN PATENT DOCUMENTS 0147251  1/1985  European Pat. Off. .
56-103343  8/1981  Japan ................................ 356/73.1

OTHER PUBLICATIONS

Imoto et al, "Polarization Dispersion Measurement in Long Single-Mode Fibers with Zero Dispersion Wavelength at 1.5 mm", IEEE J. of Quantum Electronics, vol. QE17, No. 4, 4/1981. pp. 542-545.

*Primary Examiner*—Vincent P. McGraw
*Attorney, Agent, or Firm*—Robert P. Cogan

[57] ABSTRACT

In a single mode fiber under test a direct measurement of transmissive dispersion, such as of colors or polarizations, is produced. In the measurement of chromatic dispersion, light is modulated in amplitude by a first, high frequency signal and between one wavelength and another by a second, low frequency signal. Light transmitted through a fiber under test is received by a photodetector providing an output which is compared to the high frequency reference for phase by a first phase-sensitive detector. The amplitude modulated output of the first phase-sensitive detector is compared by a second phase-sensitive detector, preferably a lock-in amplifier to the low frequency reference signal to provide a signal indicative of transmissive dispersion. Other forms of dispersion, including polarization dispersion, may be measured. A source is modulated at a first, high frequency. A second, low frequency signal is used to vary the light between the first transmissive parameter value and a second, namely a first polarization and a second polarization. The light is varied at the low frequency between two values of the independent variable with respect to which dispersion is measured.

16 Claims, 5 Drawing Sheets

FIBER OPTIC DISPERSION METHOD AND APPARATUS

BACKGROUND OF THE INVENTION

The present invention relates to means for testing transmissive optic fibers, and more particularly to measuring dispersion produced by a single mode fiber.

Single mode optical fibers are used to transmit large quantities of information and are capable of transmitting optical information over significant distances. As with any other medium of transmission, it is necessary that optical fibers transmit the information carried thereby with fidelity. In the real world, various forms of distortion introduced by transmissive media cannot be eliminated. It is, therefore, necessary to measure them, either to determine the suitability of a transmissive medium or to evaluate the manner in which such distortion will be dealt with. For a fiber optic communications system, the most significant specification for determining the information carrying capacity of the system is the bit-error rate. The bit-error rate is increased, among other factors, by the pulse broadening caused by dispersion in a fiber. Use of a single mode fiber eliminates modal dispersion. Chromatic dispersion will still remain as an inherent characteristic of a fiber. Fibers will relay different wavelength radiation differently. It has further been noted in accordance with the present invention that not only chromatic dispersion but polarization dispersion can be present as the contributor to the bit-error rate.

It is generally impractical to conduct a bandwidth measurement on a single mode fiber to determine its information carrying capacity due to the high bandwidths of single mode fibers. It is more useful to measure chromatic dispersion. Chromatic dispersion occurs due to material dispersion, the difference in index of refraction versus wavelength of a transmissive medium and also to waveguide dispersion. In a standard doped silica fiber, material dispersion varies monotonically and passes through zero in the vicinity of 1300 nm. Waveguide dispersion as a source of dispersion increases with increasing wavelength. In a known standard doped silica fiber, the contribution of waveguide dispersion is small where material dispersion is zero and the zero dispersion wavelength inherently falls in the range of 1300 nm, a naturally occuring low attenuation region. By controlling the waveguide dispersion through complex geometry of the fiber, the zero dispersion wavelength of the fiber can be forced to fall in the region of 1550 nm where the attenuation of a doped silica based fiber is even lower than at 1300 nm. Chromatic dispersion measurements are used to establish how well a particular fiber is matched to a particular transmission wavelength.

Many prior art techniques exist to measure chromatic dispersion. See, for example, National Bureau of Standards Symposium on Optical Fiber Measurements, NBS SP683, 1984. The most common technique measures propagation times of short pulses with respect to wavelengths. Such techniques are limited in resolution due to the necessity of recovering of extremely short optical pulses and due to inherent stability problems with pulse timing circuitry. Chromatic dispersion can also be measured by determining the phase shift of a continuous wave modulated light beam versus wavelength. In this prior art technique, a light source is amplitude modulated by a high frequency generator and passed through a monochromator for transmission through a fiber under test. The output of the test fiber is sensed by a photodiode, such as a germanium or galium arsenide photodiode which provides an output signal phase displaced from the signal entering the fiber. The difference in phase of the reference and the output signal is measured by a time difference detector such as a phase detector. After phase shift is determined for the fiber at one wavelength, the monochromator is changed and the entire process is repeated at another wavelength. This process in effect is a process in which a relative delay curve is generated. In order to compute dispersion a first derivative is taken, namely change in phase delay with respect to wavelength. The mathematical process of differentiation is undesirable since it also increases the uncertainty of the measurement and exacerbates noise. Due to inherent drift over relatively short periods of time of system components, uncertainty arises as to whether the difference in phase is due to chromatic dispersion or to drift. Thus measurement is subject to an effect called 1/f noise.

SUMMARY OF THE INVENTION

It is therefore an object of the present invention to provide a method and apparatus for measuring directly transmissive dispersion in which the measurement of transmissive dispersion of a single mode optic fiber is improved by at least an order of magnitude compared to indirect measurements made by the measurement of delay curves in the time domain or by simple phase shift.

It is also an object of the present invention to provide such a method and apparatus in which a low frequency alternating current becomes proportional in amplitude to differential phase shift.

It is a more specific object of the present invention to provide a method and apparatus of the type described in which a double modulation technique is used to produce a desired signal indicating the differential phase shift.

Briefly stated, in accordance with the present invention, a method and apparatus are employed for improving measurement of transmissive dispersion, as by dispersion due to chromatic dispersion in one form, in a system in which a light source is amplitude modulated, transmitted through a fiber under test and sensed by a photodetector providing an electrical signal indicative of the transmitted light. The amplitude modulation signal of high frequency is supplied to the light source, comprising a first reference frequency. This first reference frequency as well as the output of the photodetector are supplied as inputs to a first, time detector, a phase detector in a preferred form. The light source is modulated by a second, lower reference frequency modulation signal between a first wavelength and a second wavelength to produce a differential phase shift in the optical fiber under test. The second reference frequency and the output of the first, phase detector are provided to a phase sensitive amplitude detector, preferably a lock-in amplifier. The second, phase sensitive detector due to this arrangement will provide dc output proportional to the phase shift difference between the two wavelengths, eliminating the drift of the phase detector. The chromatic dispersion of the measurement system must be measured and subtracted from the test data to reveal the chromatic dispersion of the fiber under test. Consequently, chromatic dispersion is indicated directly and chromatic dispersion coefficient can be calculated directly by dividing the chromatic dispersion by the length of the fiber under test. Light may also be varied between first and second values of other transmissive parameters, e.g. polarization, to measure dispersion with respect thereto.

BRIEF DESCRIPTION OF THE DRAWINGS

The means by which the foregoing objects and features of invention are achieved are pointed out with particularity in the claims forming the concluding portion of the specification. The invention, both as to its organization, and manner of operation may be further understood by reference to the following drawings taken in connection with the following description.

Of the drawings.

DESCRIPTION OF THE PREFERRED EMBODIMENTS

Figure 2:
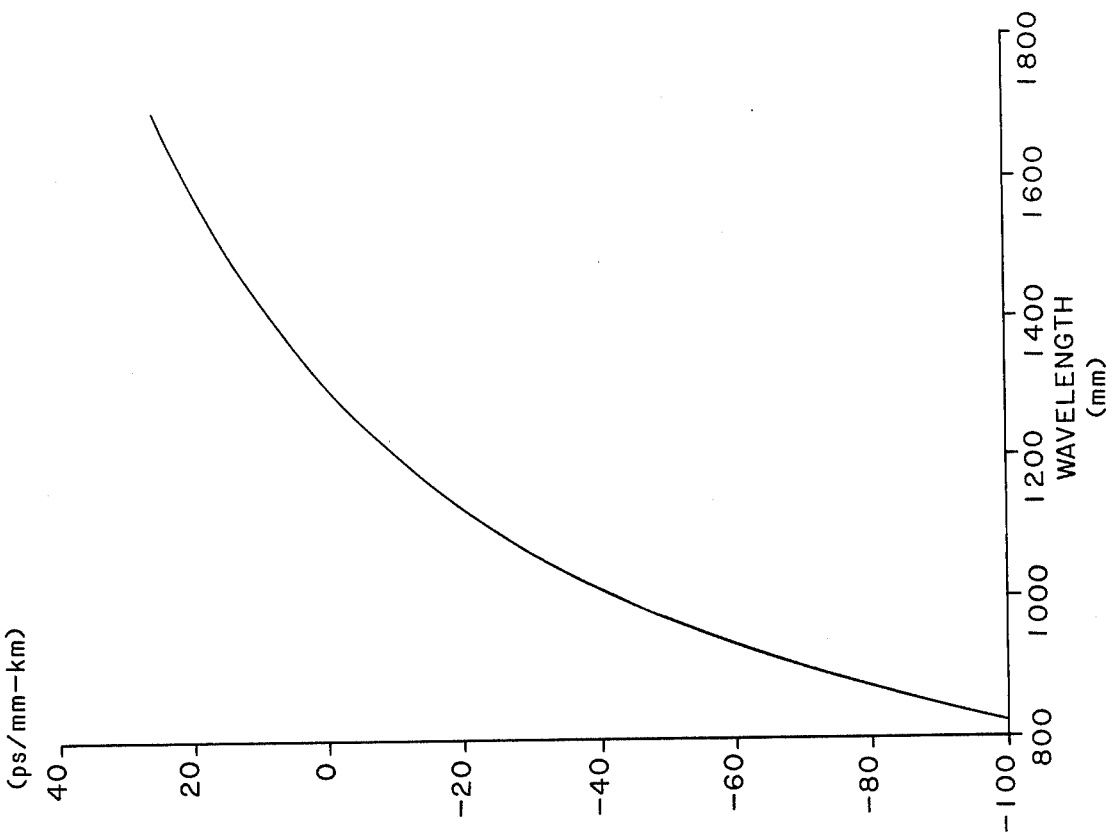
FIG. 2 is a graph illustrating chromatic dispersion coefficient versus wavelength for the nominal optical fiber and represents the first derivative of the function represented by the plot in FIG. 1.
Figure 1:
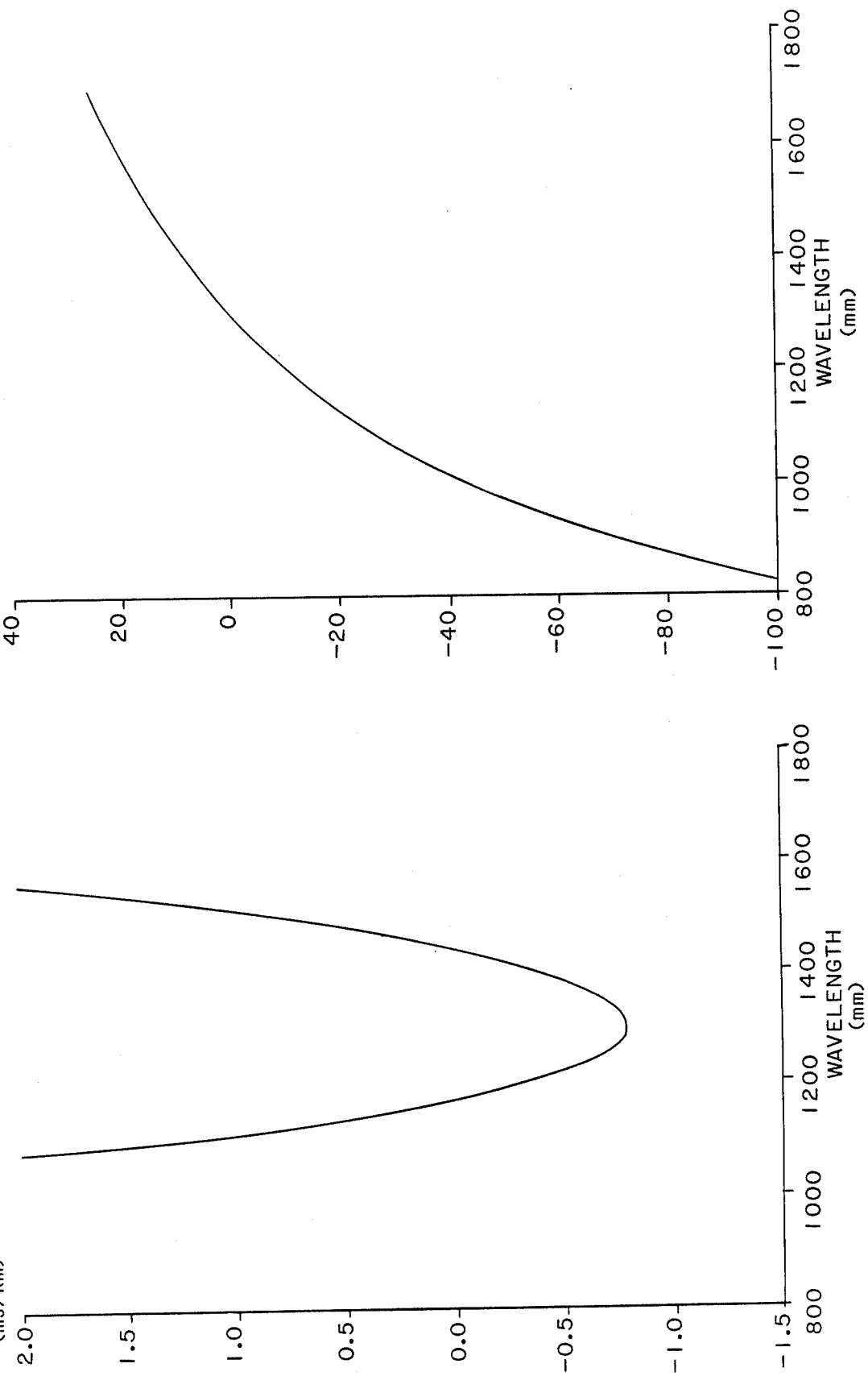
FIG. 1 is a graph illustrating the relationship of relative group delay versus wavelength for a nominal optical fiber.
Figure 3:
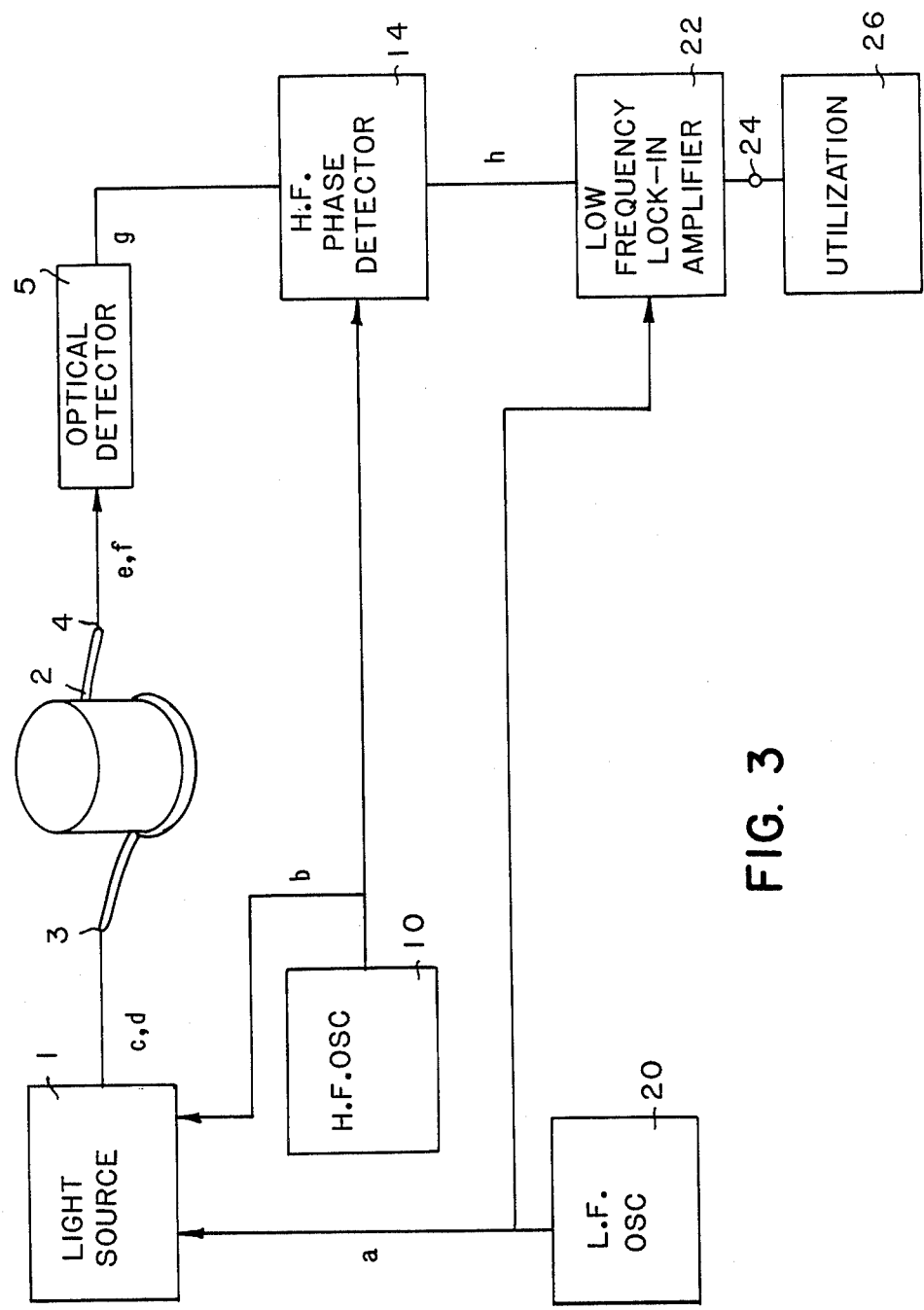
FIG. 3 is a block diagramatic representation of an apparatus constructed in accordance with the present invention.
Figure 4A:
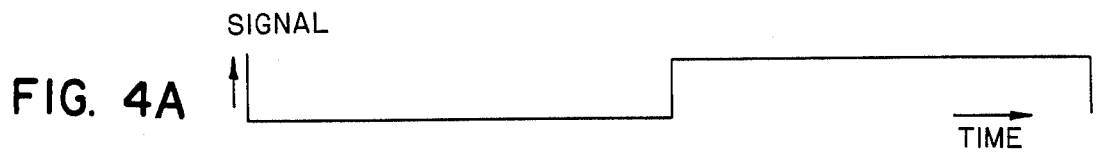
FIG. 4 is a waveform chart useful in understanding the operation of FIG. 3.
Figure 4B:
Figure 4C:
Figure 4D:
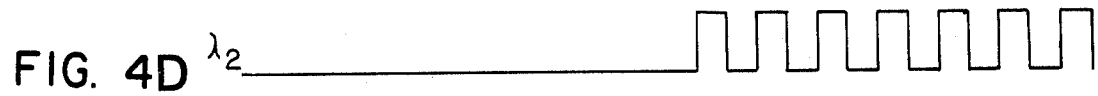
Figure 4E:
Figure 4F:
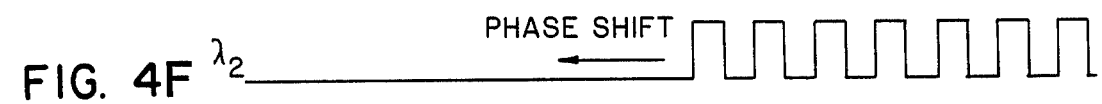
Figure 4G:
Figure 4H:
Figure 5:
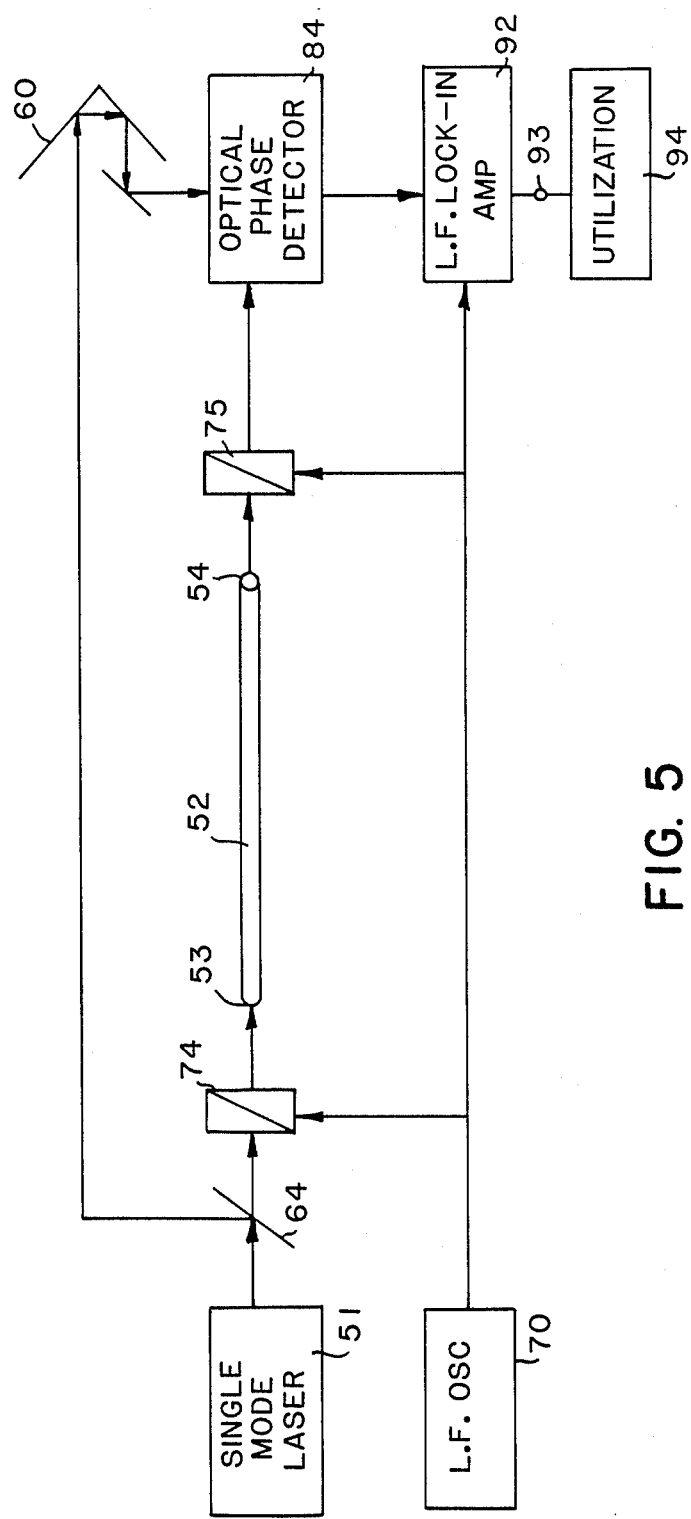
FIG. 5 is a block diagramatic representation of an embodiment of the present invention particularly suited for measuring polarization dispersion.

FIGS. 1 and 2 are graphs representing nominal characteristics relating to transmissive dispersion and are discussed to facilitate an understanding of the method and apparatus of the present invention described further with respect to FIGS. 3 through 5.

Transmissive dispersion most commonly is encountered in the form of chromatic dispersion. Light is also dispersed over varying values of other transmissive parameters. One such parameter is polarization. What is called single-mode optical fiber is not, strictly speaking, single-mode; light is propagated through the fiber in two orthogonal polarization modes. Stress induced in the glass by the drawing process, noncircularity of the core and other factors cause a so called single-mode optical fiber to be slightly birefringent, that is, the two orthogonal polarization modes travel with different group velocities through the fiber. This will cause dispersion of an optical pulse launched into the fiber. Even if completely polarized light is launched into an ordinary single-mode fiber, some of the energy will slowly leak or crosscouple into the orthogonal polarization mode resulting in polarization dispersion. Transmission may be dispersed as a function of the other parameters as well.

In FIG. 1, a nominal characteristic curve is illustrated for a known prior art doped silica optic fiber illustrating the degree to which delay is created by the fiber for a given wavelength. The abscissa is nanometers and the ordinate is nanoseconds per kilometer. FIG. 2 illustrates a chromatic dispersion coefficient. In FIG. 2, the abscissa is again wavelength, and the chromatic dispersion coefficient is expressed in terms of picoseconds per nanometer-kilometer. It is this characteristic that is sought to be maintained near zero. The fiber optic transmissive medium best approximating a zero value will provide for the best bit rate possible for digital information transmission. Known prior art systems directly measure the characteristic illustrated in FIG. 1 and calculate chromatic dispersion as a first derivative of relative delay with respect to wavelength. The derivative process enhances noise, i.e. uncertainty in result, thus degrading signal-to-noise ratio. In accordance with the present invention, however, an output directly indicative of the curve in FIG. 2 is provided. To this end, the system illustrated in block diagramatic form in FIG. 3 is provided.

Other parts of the measurement system will each introduce a delay which may be a function of a transmissive parameter. It may be necessary to make a measurement on a zero length fiber which has zero transmissive dispersion in order to measure the delay of the system versus the transmissive parameter. The system may be made self-compensating by the technique of subtraction. This subtraction technique is a well-known prior art method which, for reasons of clarity in description of the present invention, is not further described.

In FIG. 3, a modulatable light source 1 is provided for transmitting light through a fiber under test 2 having an input fiber interface 3 and an output interface 4. An optical detector 5 is provided for responding to the light emanating from the light output interface 4. The light source 1 may take any of a number of well-known forms. What is necessary is that it be modulatable in two different ways.

First, light source 1 is amplitude modulatable. In the present context, amplitude modulation refers to periodic variation to which sensing means will respond. More specifically, depending on the embodiment, modulation may comprise self-modulation of a carrier, or an amplitude modulation having a first frequency may be imposed on a carrier. When polarization dispersion is measured, the self-modulation of the carrier at one wavelength may be utilized, for example as described with respect to FIG. 5 below.

Secondly, it is modulatable at a second frequency in the dispersed characteristic. A transmissive parameter is alternately set to first and second values. More specifically, in the form in which chromatic dispersion is measured, the light source 1 is modulatable between a first wavelength and a second wavelength. The light source 1 could conveniently comprise first and second lasers providing first and second transmission wavelengths respectively, both of which are amplitude modulated. The second modulation comprises alternate selection of the first and second lasers for transmission through the fiber 2. Where polarization dispersion is measured the light source 1 in one form comprises means for alternately selecting a first or second polarization for the second modulation.

Lasers are useful in that they launch high optical power into the fiber 2. In order to optimize with respect to cost, however, a light emitting diode transmitting through a tunable optical filter, monochromator or similar device could replace multiple lasers. Incandescent lamps and gas discharge emitters such as arc lamps could be utilized if they could be provided with sufficient radiance since they can be externally modulated at the high frequency by an external modulator. In the current state of the art, such emitters would be useful only with lower resolution instruments than could be achieved utilizing lasers or light emitting diodes.

In order to provide a first form of amplitude modulation, a high frequency oscillator 10 is provided producing a first, high frequency reference signal. The oscillator 10 comprises a first and coherent modulation source having a substantially pure, constant component of oscillating frequency.

"High frequency" is a terminology used for convenience, and is high compared to a second reference frequency further described below. The frequency of the oscillator 10 is one suitable at which to amplitude modulate the output of the light source 1 and provide a measurable phase shift produced at the output interface 4 of the fiber 2 which is sensed by and indicated by the output of the photodector 5. A suitable modulation frequency is 50 MHz. The particular modulation frequency is not critical. Selection of a suitable modulation frequency for this oscillator may be selected in the same manner as prior art systems in which delay versus wavelength is measured directly.

Outputs of the oscillator 10 and optical detector 5 are connected to a first detector 14 which is a time detector used for indicating the difference in time travel introduced by the fiber 2 under test as compared to the modulated signal from the light source 1 undelayed. The preferred form of the first detector 14 is a time detector which is a balanced mixer having the function $Y = A \cos(\theta + \pi/2)$ which is equal to $Y = A \sin \theta$, where $Y$ = the output, A is in amplitude of input and $\theta$ is angle between the input signal and the first reference signal. It is contemplated that the amplitude A will be controlled to provide a constant amplitude to the balanced mixer, the first detector 14, and $\theta$ will be small. The detector 14 will, therefore, function as a phase detector 14.

Means are provided to modulate the light source between first and second value of a transmissive parameter, e.g. wavelength or polarization. A low frequency oscillator 20 provides a second reference signal and has outputs connected to the light source 1 and to a second detector 22. The second detector 22 responds to the output of the first detector 14. Here again, the term low frequency is rather arbitrary and is used for convenience. The frequency is low compared to that of the oscillator 10. It is sufficiently high to eliminate the 1/f noise effect, and is preferably in the range of 100 to 400 Hz. In the preferred embodiment, the low frequency oscillator 20 provides an output of 400 Hz. First and second wavelengths are provided from the source 1 for alternate half cycles, i.e. successive equal periods of time. Transmissions are differently delayed by the fiber 2 due to the chromatic dispersion phenomenon.

Consequently, the dc signal provided at the output of the phase detector 14 for one wavelength in the case of chromatic dispersion measurement, is varied at the frequency of the low frequency oscillator 20. This output is compared to the second reference signal. The detector 22 is preferably a phase-sensitive detector, and more specifically a low frequency lock-in amplifier providing an output proportional to the ac component of the output of the detector 14 in phase with the output of the low frequency oscillator 20. The detector 22 has the function $X = B \cos \phi$ where X is the output thereof and $\phi$ is the angle between the output of the phase detector 14 and the second reference signal and B is the amplitude thereof. Where $\phi$ is constant and near zero, X varies with B. The output of the low frequency lock-in amplifier 22, provided at an output terminal 24, is directly proportional to the transmissive dispersion, namely chromatic dispersion.

The output terminal 24 is connected to utilization means 26 comprising means for receiving and storing successive dispersion measurements and for generating dispersion curves.

This method of producing the output directly proportional to dispersion in the operation of the apparatus of FIG. 3 is further described with respect to FIG. 4. FIGS. 4 a through h each have a common abscissa of time and have the ordinate drawn to an arbitrary scale. Letters corresponding to the portion of FIG. 4 are noted in the circuit diagram of FIG. 3 at terminals at which these signals appear.

FIG. 4a represents the second reference signal described with respect to FIG. 3, namely the output of the oscillator 20. FIG. 4b represents the first reference signal, the so called high frequency signal provided by the high frequency oscillator 10. In FIG. 4, for simplicity in illustration, arbitrary amplitude and time scales are used. For simplicity in illustration a fraction of the pulses of the first reference signal per pulse of the second reference signal are illustrated. The wavelength modulation between first and second wavelengths of the light source 1 is achieved at the frequency illustrated in FIG. 4a. Intensity modulation is accomplished at the frequency illustrated in FIG. 4b. Consequently, as illustrated in FIGS. 4c and 4d respectively, for successive half-cycles of the second reference frequency, the light source 1 provides an amplitude modulated output at the first wavelength and then at the second wavelength respectively.

In FIGS. 4e and 4f, the optical output at the interface 4 of the fiber under test 2 illustrated produced in response to the optical inputs illustrated in FIGS. 4c and d respectively. Due to the optical response of the fiber 2 as illustrated in FIG. 1, the fiber 2 produces a different delay for each wavelength applied thereto. Therefore, the optical outputs illustrated in FIGS. 4e and f are each phase-displaced with respect to the optical outputs illustrated in FIGS. 4c and d respectively. One degree of phase displacement in this example is different from the other. The photodetector 5 therefore produces the output illustrated in FIG. 4g, namely a combination of all transmissions through the fiber 2. The output of the photodetector 5 is compared to the output of the high frequency oscillator 10 by the phase detector 14 providing the output illustrated in FIG. 4h.

As explained above, the phase detector 14 produces a direct current output proportional to the phase shift between the inputs thereto. Therefore, the output of the phase detector 14, as illustrated in FIG. 4h will comprise a square wave having a peak-to-peak amplitude proportional to the differential phase shift resulting from transmissive dispersion in the optical fiber. The output of the phase detector 14 will be synchronous with the second reference frequency produced by the low frequency oscillator 20.

Since the output illustrated in FIG. 4h is synchronous with the second reference frequency, the phase angle $\phi$ is constant. The output of the lock-in amplifier 22 will vary with the peak to peak amplitude of the phase detector 14. Consequently, the output amplitude of the low frequency lock-in amplifier 22 is a direct current signal directly proportional to chromatic dispersion produced by the fiber 2.

FIG. 5 is an embodiment of the present invention particularly suited for measuring polarization dispersion. Polarization may be linear or elliptical. A single mode laser 51 provides light to a fiber 52 under test. The fiber 52 has an input interface 53 and an output interface 54. The output of the laser 51 is modulated at a first, high frequency. High frequency here is defined similarly as with respect to FIG. 1. Modulation in this embodiment is self modulation at the optical frequency of the laser.

A second, low frequency reference oscillator means 70 is provided. A beam splitter 64 transmits light directly from the laser 51 and also supplies light to the optical phase shifter 60. A polarizer 74 and analyzer 75, comprising polarization modulation means on opposite sides of the fiber 52, are each connected for operation by the low frequency oscillator 70. The vector of the polarizer 74 and/or analyzer 75 can be rotated synchronously at the frequency of the low frequency oscillator 70. Relative rotation of the polarizer 74 and analyzer 75 may be provided by holding either of the two fixed at any desired orientation and rotating the other. While it is preferable to use both a polarizer 74 and analyzer 75, using one or the other may provide sufficient sensitivity. For linearly polarized Eigenvectors, polarization vectors may be varied orthogonally with respect to a principal axis of the fiber 52. More generally speaking, since the present invention may be used to measure dispersion of elliptically polarizated Eigen-vectors as well, elliptical Eigenvectors, which may be viewed as being on the Poincare sphere, may be orthogonally varied with respect to the fiber 52.

Both the analyzer 75 and optical phase shifter 60 provide light input to an optical phase detector 84. The optical phase detector 84 is a well-known prior art instrument providing a dc output proportioned to the relative phase between the light in the two paths to the optical phase detector 84 from the beam splitter 64. The optical phase shifter 60 is provided to allow for a quadrature relationship between light in the first and second inputs to the optical phase detector 84 to permit utilization of the phase relationship described with respect to the detector 14 above.

Both the low frequency oscillator 70 and optical phase detector 84 have inputs connected to a phase-sensitive detector functioning as an amplitude detector 92. The amplitude detector 92 is preferably a low frequency lock-in amplifier and provides an output at an output terminal 93 directly proportional to the peak-to-peak amplitude of the output of the optical phase detector 84. The low frequency oscillator 70 is once again arbitrarily named. The oscillator 70 provides a second reference signal which is low compared to the frequency of that of source 51 but sufficient to overcome 1/f noise. The output terminal 93 is connected to utilization means 94 comprising register, calculating and storage means whereby entire characteristic curves for dispersion polarization variation may be stored and reproduced.

The method of the present invention with respect to indicating polarization dispersion is comprehended by the following description of the operation of the apparatus of FIG. 5. A fiber under test 52 is provided. The fiber 52 will be analyzed for polarization dispersion at a particular wavelength. At least first and second polarizations of a coherently varying light source will be transmitted through the fiber 52 at the first modulation frequency. At separate times, additional polarizations will be transmitted with respect to the axes of the fiber 52 to increase sensitivity. Also for increased sensitivity, the first modulation frequency may be the optical frequency of the carrier. For example, a laser 51 providing a wavelength of 1300 nm has a frequency of $2.3 \times 10^{14}$ hz, or 230 THz. At this frequency, the detection described above is very sensitive to small differences in propagation time of fast and slow axes of the fiber 52. The polarizer 74 and analyzer 75 are set at a first elliptical polarization with respect to each other so that a first polarization is delivered from the output interface 54. The relative polarization between the polarizer 74 and the analyzer 75 is varied at the reference frequency provided by the reference oscillator 70. A small difference in propagation time is produced with respect to polarization. Consequently, the optical phase detector 84 during half-cycles provides a first DC output proportional to the phase difference for the selected polarization at the frequency of interest. This results in a peak-to-peak amplitude modulation of the signal at the output of the optical phase detector 84.

The low frequency lock-in amplifier 92 measures the peak-to-peak amplitude of the output of the optical phase detector 84 at the frequency of the oscillator 70. The DC output at the terminal 93 is directly representative of polarization dispersion. If indeed there is no phase shift due the polarization dispersion effect in the fiber 52 there will be no phase shift during successive half cycles of the low frequency oscillator 70. Therefore, the output of the optical phase detector 84 will have a constant value. Therefore, a zero dispersion would be indicated by a zero output at the terminal 93. It must, of course, be recognized that such terms as "zero" are used in their relative sense. Values and factors may be scaled or offset.

What is thus provided is a method and apparatus in which a transmission time delay produced by a fiber under test for a first transmissive value of a light signal is measured. Transmissive value comprehends wavelength or it could comprehend polarization of a single mode light signal with respect to axes of a fiber under test. The parameter value is then changed, and time delay produced by the fiber is measured again. A difference between the two time delays indicates dispersion for the given transmission parameter of the light. This is unlike known prior art systems in which a signal is produced which could be characterized as a subtractive, first derivative, or delta signal, which is inherently subject to the 1/f noise characteristics. In the above descriptions, the modulation was particularly described as between a first and second value. However, the above description and illustrations of apparatus may also be viewed as means for measuring dispersion between second and third and then third and fourth and then fourth and fifth transmission values as well, whereby an entire chromatic dispersion curve or polarization dispersion curve can be generated.

What is claimed as new and desired to be secured by Letters Patent of the United States is:

1. Transmission dispersion measuring means for an optic fiber under test comprising receiving means for receiving light through the fiber and producing an electrical signal in response thereto, the fiber under test having a characteristic wherein there is a one-to-one correspondence between a time delay produced therein and value of the transmissive parameter, first means for providing a coherently varying light signal for response thereto by said receiving means resulting from said time delay, a first time detector means for measuring said time delay and providing an ac signal indicative thereof, said first time detector means having a first input responsive to said receiving means and a second input, said second input comprising a first reference signal indicative of a modulating signal undelayed by the fiber, said measuring means further comprising means for modulating the value of the transmissive parameter in accordance with the frequency of a second reference signal at a second reference frequency alternately to first and second values of said transmissive parameter, whereby said ac signal is at said second reference signal frequency and second detector means for responding to the output of said first time detector means and to said second reference signal to produce an output indicative of said dispersion proportional to a component of said ac signal in phase with the second reference signal.

2. Apparatus according to claim 1 wherein said means providing a coherently varying light signal comprises an amplitude modulatable light source.

3. Apparatus according to claim 2 wherein said means for modulating the transmissive value comprises means for varying the optical wavelength of said light source to and from a first wavelength and a second wavelength.

4. Apparatus according to claim 3 wherein said first time detector comprises a phase detector.

5. Apparatus according to claim 4 wherein said second detector means is a phase-sensitive detector.

6. Apparatus according to claim 5 wherein said second detector means comprises a lock-in amplifier.

7. Apparatus according to claim 6 further comprising means for storing a value indicative of said output of said second detector means and further means for modulating between additional first and second preselected values of said transmission parameter and storing further outputs of said second detector means, whereby dispersion with respect to optical wavelength of the light source is indicated.

8. Apparatus according to claim 1 wherein said means providing a coherently varying light signal comprises a coherent laser.

9. Apparatus according to claim 8 further comprising a polarization modulation means in the optical path between said laser and said first time detecting means, said means for modulating the value of the transmissive parameter comprises means for alternately selecting first and second relative polarizations with respect to an axis of said fiber under test.

10. Apparatus according to claim 9 wherein said first time detector comprises an optical phase detector means.

11. Apparatus according to claim 10 wherein said second detector means comprises a lock-in amplifier.

12. A method for measuring transmissive dispersion of an optic fiber comprising the steps of providing a light source providing light having selected values of a transmissive parameter with respect to which dispersion is being measured, imposing from a source of variation a coherent variation on the light, transmitting the light through said fiber under test whereby a time delay is produced in said fiber having a magnitude whose value for said fiber has a one-to-one correspondence with the value of the transmissive parameter, producing a first output indicative of the time delay by detecting the coherent variation of the light transmitted through the fiber and comparing the detected variation to the source of variation, modulating the value of the transmissive parameter to and from a first and a second value respectively during successive half cycles in accordance with a modulation frequency from a modulation frequency source, whereby the first output comprises a time difference signal at the modulation frequency, and measuring a component of the first output in phase with the modulation frequency source to provide an output indicative of transmissive dispersion.

13. The method according to claim 12 wherein each step of detecting time delay comprises comparing relative phase.

14. The method according to claim 13 wherein said transmissive parameter is wavelength, the step of transmitting coherently variable light comprises amplitude modulating said light source, and the step of modulating said transmissive parameter comprises varying the wavelength of said light transmitted through said fiber under test to and from first and second values during successive half cycles.

15. The method according to claim 13 wherein said transmissive parameter is polarization, said light source is a coherent laser and the step of modulating comprises the step of orthogonally varying the vectors on the Poincare sphere of the polarization transmitted through the fiber under test during successive half cycles with respect to an Eigenvector thereof.

16. Apparatus for measuring chromatic dispersion in a single mode transmissive optical fiber comprising modulatable light source means for providing light through a fiber under test, optical detector means for responding to modulated light received after transmission through said fiber under test, first modulation means for modulating said light source in intensity at a high frequency and second, low frequency wavelength modulating means for modulating the wavelength of said light source to and from a first wavelength and a second wavelength, high frequency phase detector means for providing an output responsive to the phase difference between the high frequency modulation signal and the output of said optical detector means, and second detector means responsive to amplitude difference at the output of said high frequency phase detector, the output of said second detector means comprising an output proportional to phase displacement differences for the first and second wavelengths in the fiber under test, whereby the output of said second detector means is proportional to chromatic dispersion.

* * * * *